May 26, 1925.

K. O. LEON

ANTIFRICTION THRUST BEARING

Filed April 27, 1920     2 Sheets-Sheet 1

1,539,750

Inventor
K. O. Leon,
By H. R. Kerslake
Attorney

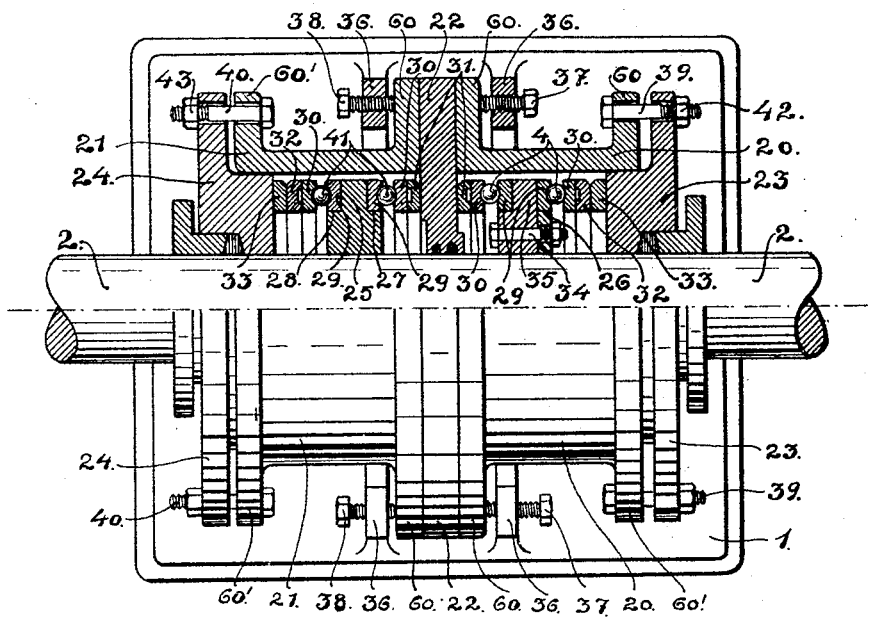

Patented May 26, 1925.

1,539,750

UNITED STATES PATENT OFFICE.

KARL OSKAR LEON, OF GOTTENBORG, SWEDEN, ASSIGNOR, BY MESNE ASSIGNMENTS, TO NYA NORDISKA KULLAGER AKTIEBOLAGET, OF GOTTENBORG, SWEDEN.

ANTIFRICTION THRUST BEARING.

Application filed April 27, 1920. Serial No. 377,104.

*To all whom it may concern:*

Be it known that I, KARL OSKAR LEON, a subject of the King of Sweden, residing at Gottenborg, in the county of Goteborg and Bohus and Kingdom of Sweden, have invented new and useful Improvements in Antifriction Thrust Bearings, of which the following is a specification.

This invention relates to antifriction ball or roller thrust-bearings and more especially to such bearings adapted to be used in connection with screw-propeller-shafts in ships.

This invention has for its object to provide a bearing wherein, if one or more of the bearing elements happens to be damaged, it may be easily removed without stopping the engine.

In the accompanying drawings two embodiments of the invention are illustrated. Fig. 1 shows a top plan view of one embodiment of a thrust block with bearings the upper portions in axial section.

Fig. 3 shows a similar view to Fig. 1 according to the other embodiment of the invention.

Figure 1:
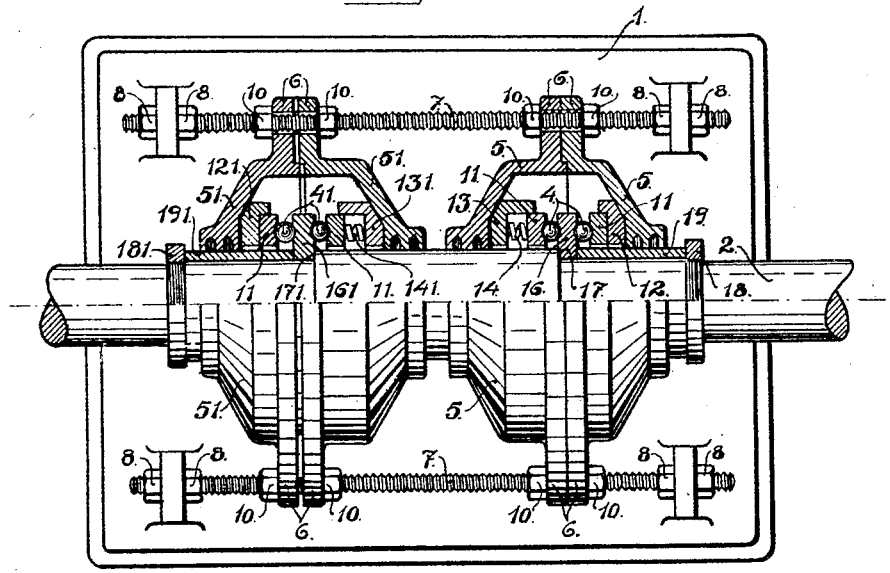
Figure 2:
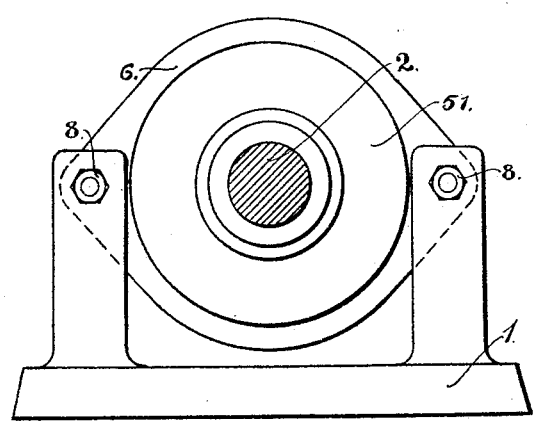
Fig. 2 is an end elevation of the same device.

Referring now to the drawings 2 indicates a thrust shaft, which in the embodiment shown in Figs. 1 and 2 operates in two thrust bearings 4 and 41 each double-acting that is to say designed to take up axial pressure in both directions and for this purpose provided each with two rows of balls. Each of the bearings 4, 41 is enclosed in its own casing 5 and 51, each casing consisting of two halves, provided with flanges 6, which are passed through by two longitudinal, threaded tie rods 7, the ends of which latter are attached by means of nuts 8 to the base-plate 1 of the thrust block. The halves of the casings 5, 51 are prevented from nonintentional displacement from each other by means of nuts 10, threaded on the tie rods 7 on both sides of the flanges 6. The middle discs or thrust collars 16 and 161 of the bearings 4, 41 are kept stationary against shoulders 17 and 171 formed on the shaft 2 by means of sleeves 19 and 191 and nuts 18 and 181 threaded on the shaft 2. The two outer bearing discs or thrust collars 11 of the two bearings 4, 41 bear in a known manner against thrust-rings or collars 12, 13, 121 and 131, while the supporting effect of the rings 13 and 131 is obtained by means of intermediate resilient supports 14 and 141.

The device described operates in the following manner:

In the drawing the right-hand bearing 4 is illustrated as in loaded position, while the left-hand bearing 41 is unloaded and may be thought to serve as a spare bearing. For this purpose the two halves of the casing 51 are spaced from each other, which is effected by unscrewing the nuts 10 of the said casing away from its flange 6. If then the bearing 4 on account of any reason should want to be unloaded, say for instance, that one or more balls in the bearing have been damaged, disturbing the due operation of the bearing, the nuts 10 of the casing 5 are loosened, while simultaneously the nuts 10 of the casing 51 are tightened up. Hereby the halves of the casing 5 become separated releasing the thrust on the rings 12, 13, while the halves of the casing 151 act upon the rings 121 and 131 in the direction against the middle disc 161, so that the bearing 41 becomes operative instead of the bearing 4, which simultaneously was unloaded.

The embodiment shown in Fig. 3 differs from that one described principally thereby that two double-acting bearings are enclosed in one and the same casing. This consists of two sockets 20 and 21 provided at both ends with projecting flanges 60 and 60' respectively. Between the said sockets there is disposed a longitudinally slidable washer 22, divided in two parts and tightening against the shaft 2. The sockets 20 and 21 are in the ends opposing the washer 22 tighting closed about the shaft 2 by means of collars 23 and 24. Thus between the shaft 2, the sockets 20, 21 and the rings 23, 24 there are formed closed chambers, containing each two single-acting antifriction bearings 4 and 41, provided on each side of a collar 25 and 26 firmly secured to the shaft 2 in any convenient way, so that the two bearings 4 and 41 constitute each a double-acting thrust-bearing. Shoulders 27 and 28 are formed on the sides of the collar 25, said shoulders constituting each a support for the inner two-part thrust ring 29 of the respective bearings, while the outer thrust rings 30 of the bearings bear against somewhat resilient supporting rings 31 and 32, of which the first mentioned ring 31 bears directly against the washer 22 and the last mentioned ring 32 by means of an intermediate washer 33 bears against the ring 24. The collar 26 together with a ring 35 attached thereto by means of screw-bolts 34 forms a support for the inner race rings 29 of the two bearings 4, while the outer race rings 30 of said bearings bear against the washer 22 and the ring 23 in the same way as described for the race rings 30 of the bearings 41.

The thrust block on each side of the shaft 2 is provided with two projections 36, between which the washer 22 and the inner flanges 60 of the sockets 20 and 21 are disposed, whereby the distance between two projections 36 on the same side of the shaft 2 is so large, that the parts 20, 21 and 22 in requisite extent can be displaced longitudinally as far as permitted by adjusting screws 37 and 38.

The other flanges 60' of the sockets 20 and 21 receive screw-bolts 39 and 40, which also pass through the rings 23 respectively 24, against which they can be set up by means of nuts 42 respectively 43.

The device according to Fig. 3 operates in the following manner.

In the drawing the bearings 41 are illustrated as operative, while the bearings 4 are unloaded and form a spare-bearing. For this purpose the screw-bolts 39 are loosened and the screws 37 tightened up, so that the washer 22 is kept stationary against the supporting ring 31 of the innermost of the two bearings 41. The screws 38 as well as the nuts 43 are tightened up, so that the ring 24 together with the flange 25 form a stationary support for the outermost of the two bearings 41. If now for any reason the bearings 41 are to be unloaded and the bearings 4 caused to take up the thrust from the shaft 2, the nuts 43 and the screws 37 are unscrewed to the proper extent, after which the screws 38 are tightened up, whereby the washer 22 is displaced against the supporting ring 31 of the innermost of the two bearings 4. After that the screws 37 and the nuts 42 are tightened up so far, that the row of balls of the outermost of the two bearings 4 becomes fully loaded.

I do not limit myself to the two embodiments herein specifically described and illustrated in the drawings but may be allowed to vary the details within the scope of the invention. Thus roller bearings may substitute one or more of the ball bearings and each double-acting bearing may be provided with more than two rows of balls or rollers, as also more than two double-acting bearings be provided in one and the same casing, and still other alterations may be made without departing from the scope of the invention. Likewise the bearings may be designed such that for instance a row of balls in a double-acting bearing co-operates with a row of balls in another double-acting bearing. Other combinations of the rows of balls are also conceivable in a thrust block according to this invention.

What I claim is:—

1. In combination, a plurality of shaft carried collars, thrust collars arranged on opposite sides of each shaft carried collar, rolling members interposed between the shaft carried and thrust collars arranged to take up loads in either direction, means mounted for displacement axially with respect to the shaft supporting certain of said thrust collars, and resilient members interposed between the displaceable means and the thrust collars supported thereby, said resilient members being adapted to press the thrust collars toward the shaft carried collars with requisite pressure to cause the rolling members to take up the load of the bearing, the rolling members associated with either shaft carried collar being capable of being unloaded, independently of the other loaded rolling members by proper movement of the displaceable means to such extent that said resilient members are slackened up so that the rolling members still retain their rolling contact with the shaft carried collar without transmitting any substantial load from the thrust collar to the shaft carried collar.

2. In combination, a plurality of shaft carried collars, thrust collars arranged on opposite sides of each shaft carried collar, sets of rolling members interposed between the shaft carried and thrust collars, means mounted for displacement axially with respect to the shaft supporting certain of said thrust collars and adapted to render either set of rolling members inoperative while the load is carried by the other set, and resilient members interposed between the displaceable means and the thrust collars supported thereby.

3. In combination, a plurality of shaft carried collars, thrust collars arranged on opposite sides of each shaft carried collar, sets of rolling members interposed between the shaft carried and thrust collars, means mounted for displacement axially with respect to the shaft and supporting certain of said thrust collars and adapted to render either set of rolling members inoperative while the load is carried by the other side, adjustable means for maintaining the displaceable means in various positions, and resilient members interposed between the displaceable means and the thrust collars supported thereby.

4. In combination, a plurality of shaft carried collars, thrust collars arranged on opposite sides of each shaft carried collar, sets of rolling members interposed between the shaft carried and thrust collars, and means exerting axially yielding pressure against certain of the thrust collars and mounted for adjustment axially with respect to the shaft carried collars whereby either set of rolling members may be relieved of the load while the latter is sustained wholly by the other set.

5. In combination, a plurality of shaft carried collars, thrust collars arranged on opposite sides of each shaft carried collar, sets of rolling members interposed between the shaft carried and thrust collars, a rigid support for certain of the thrust collars, means mounted for displacement axially with respect to the shaft and supporting other of said thrust collars and adapted to render either set of rolling members inoperative while the load is carried by the other set, and resilient members interposed between the displaceable means and the thrust collars supported thereby.

6. In combination, a plurality of shaft carried collars, thrust collars arranged on opposite sides of the shaft carried collars, a set of rolling members interposed between each shaft carried collar and the thrust collars associated therewith, an adjustable support for certain of the thrust collars, means mounted for displacement axially with respect to the shaft and supporting others of said thrust collars and adapted to render either set of rolling members inoperative while the load is carried by the other set, and resilient members interposed between the displaceable means and the thrust collars carried thereby.

In testimony whereof I have affixed my signature.

KARL OSKAR LEON.